Feb. 6, 1968  W. A. GERRANS  3,367,706
TREE CLAMP
Filed Oct. 24, 1965
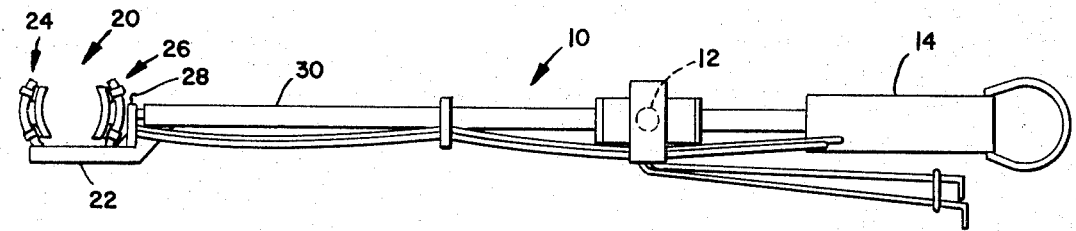
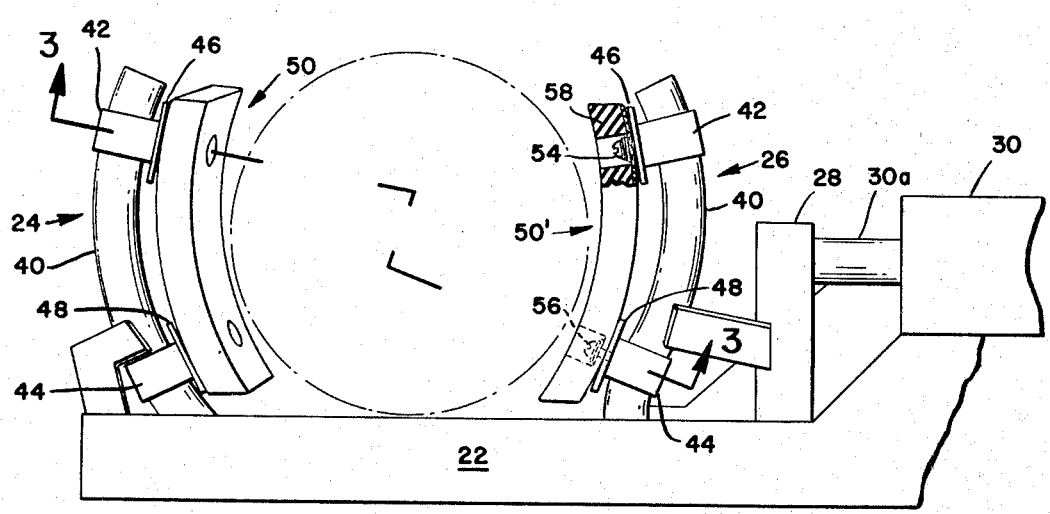
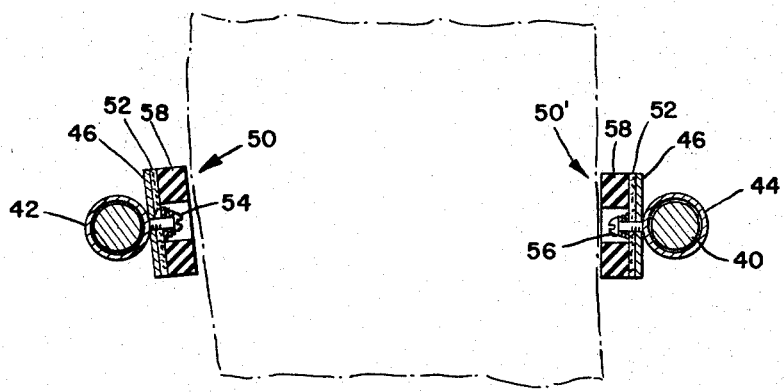
INVENTOR.
WILLIAM A. GERRANS
BY
Paul B. File
PATENT AGENT

3,367,706
TREE CLAMP
William A. Gerrans, 15 Florimond Drive,
Colusa, Calif. 95932
Filed Oct. 24, 1965, Ser. No. 504,888
1 Claim. (Cl. 294—103)

The present invention relates generally to clamping structures and more particularly to a clamp which may be releasably secured to the limb of a tree or the like to enable the transmission of vibratory shaking forces thereto.

With increasing frequency, orchardists having fruit or nut tree ranches have been replacing manual labor with automatic machinery for harvesting of the fruit or nuts. In particular, it is becoming conventional practice to eliminate manual picking of fruits or nuts from the trees and to provide automatic tree-shaking mechanisms for this purpose. These shaking mechanisms conventionally include a boom having a vibratory mechanism at one end thereof and a releasable clamp at the remote end which can be moved readily into position adjacent a tree limb and subsequently may be actuated to effect clamping engagement with the limb. Consequently, when the vibratory mechanism is actuated, shaking forces are transmitted through the clamp to the tree limb and the fruit or nuts are dislodged therefrom to fall into a suitable receptacle. In order to properly transmit the requisite forces, the clamp must engage the limb firmly but it has been observed that such firm clamping engagement coupled with the subsequent transmission of forces has caused severe bark damage and subsequent deterioration of the tree.

It is accordingly a general object of the present invention to provide a tree clamp which is arranged to establish firm clamping engagement with the tree so that the requisite vibratory forces can be transmitted thereto, yet which will grip the tree in a manner which minimizes damage thereto during the shaking operation.

More particularly, it is a feature of the invention to provide a tree clamp including a pair of jaws which are relatively movable to enable establishment of clamping engagement with a tree limb yet which include cushions arranged to mitigate tree damage.

Yet more specifically, the tree-engaging cushions include rigid mounting members at positions spaced from points of maximal transfer of force to the tree.

Additionally, it is a specific feature to provide a tree clamp wherein each of the jaws is mounted for limited pivotal movement away from the plane within which the shaking force is exerted thus enabling accommodation of limbs whose diametrically opposite surfaces are non-parallel.

These as well as other objects and features of the invention will become apparent from a perusal of the following description of the exemplary embodiment of the invention shown in the accompanying drawing wherein:

FIG. 1 is a top-plan view of a portion of a tree-shaking mechanism including a tree clamp incorporating features of the present invention, FIG. 2 is an enlarged fragmentary plan view of the tree clamp structure, portions of the structure being broken away to illustrate details thereof, and FIG. 3 is a transverse fragmentary sectional view taken along line 3—3 of FIG. 2.

With initial reference to FIG. 1, an elongated tubular boom 10 is centrally suspended as indicated at 12 so that it may partake of axial motion imparted thereto by a vibrator mechanism 14 positioned adjacent one end of the boom. The entire structure is mounted from any suitable support (not shown) forming no part of the present invention. By way of example, a boom and vibrator structure as shown in FIG. 1 is described in detail in my prior patent application, Ser. No. 153,069, entitled, Fruit and Nut Harvester, now United States Patent No. 3,248,865.

In accordance with the present invention, a novel tree clamp 20 is positioned at the extremity of the boom 10 remote from the vibrator mechanism 14, details of the tree clamp structure being shown more clearly in FIGS. 2 and 3 to which additional reference is now made.

A rigid bracket 22 in the form of a U-channel member is secured to the side of the boom 10 to extend at first outwardly and then forwardly therefrom, projecting a considerable distance beyond the end of the boom itself. Two jaws 24, 26 project substantially laterally from the brackets 22 at spaced points to form the clamp structure which therefore takes the general form of a C-clamp. The outermost jaw 24 is fixed to the extremity of the projecting bracket 22 whereas the other jaw 26 is rigidly secured by a connecting member 28 to the end of the piston 30a of a double-acting hydraulic ram 30 whose cylinder is mounted within the hollow tubular end of the boom. Suitable hydraulic connections project laterally from the hydraulic cylinder and thence along the boom 10 to suitable control elements (not shown) which are preferably mounted at the remote extremity of the boom adjacent the vibratory mechanism 14 in the manner described in my referred-to prior patent application. Application of hydraulic pressure to one end of the cylinder moves the movable jaw 26 toward the fixed jaw 24 and, in turn, application of hydraulic pressure in the other direction effects a retraction of the movable jaw. During such movement, the jaw 26 is guided through the simple expedient of establishing sliding engagement of a lateral portion of the connecting member 28 within the U-channel of the bracket 22.

In accordance with the present invention, each of the jaws 24, 26 is formed in a like fashion so that details of only one jaw will be described and the corresponding parts of the other jaw will be indicated by like numerals with an added prime notation. Each jaw 24 or 26 includes a rod 40 of arcuate configuration and dimensioned so that the center of the arc of each jaw is substantially aligned with the described hydraulic ram 30. The rod 40 is encompassed at spaced positions adjacent its opposite ends with sleeves 42, 44 which are loosely received thereover so as to be capable of limited pivotal movement about the rod. Welded or otherwise secured to the outside of the sleeves 42, 44 and interiorly of the arc defined by the rod are mounting plates 46, 48 to which a tree-engaging cushion 50 is secured adjacent its opposite extremities.

Preferably, the cushion 50 includes a reinforced resilient backing member 52 which is adapted to engage the described plates 46, 48 and be held slidably thereagainst by the application of suitable screws 54, 56 which pass through openings in the backing member 52 and enter threaded holes in the mounting plates. The screws 54, 56 permit limited pivotal motion of the adjacent cushion portion therearound so that the cushion 50 can shift relative to the backing plates 46, 48 so as to accommodate various tree configurations. A layer of soft rubber 58 is placed over the backing member 52 to form a resilient tree-engaging surface, the rubber layer having two openings therein enabling application of the screwed connection as described hereinabove. It is to be expressly observed that the mounting plates 46, 48 are located on opposite sides of the force vector established by the hydraulic ram 30 wherefore the maximal force of engagement between the cushion 50 and a tree limb is applied centrally of the cushion whereat the rear face of the cushion is engaged by no backing plate or other rigid member. As a consequence, resilient but firm engagement with the tree limb can be established.

Additionally, it is to be observed that the entire cushion 50, since it is mounted on the sleeves 42, 44 which can pivot on the mounting rod 40, can itself pivot out of the plane defined by the C-clamp and through which the described force vector passes. Accordingly, if diametrically opposed surfaces of an engaged tree are non-parallel as shown in FIG. 3, one of the cushions 50 or 50' can pivot angularly on the pivot rod 40 when the forces are applied to automatically accommodate itself to the surface of the tree thus further reducing any damage to the bark. In turn, transverse variations in the tree configuration are accommodated by pivotal motion of the cushion portions about the mounting screws 54, 56.

In summation, the completely resilient construction of the cushion 50 and the absence of a rigid backing at points of maximal force application, coupled with the pivotal mounting of each of the cushions has substantially eliminated damage to tree limbs even when rather violent shaking forces are imparted thereto.

Obviously, various modifications and/or alterations can be made in the described structure without departing from the spirit of the present invention and accordingly the foregoing description of one embodiment is to be considered purely as exemplary and not in a limiting sense. The actual scope of the invention is to be indicated only by reference to the appended claim.

What is claimed is:
1. A tree clamp which comprises
a fixed jaw and
a second jaw mounted for movement toward and away from said first jaw,
each of said jaws including
a rod and
a resilient cushion secured to said rod at spaced points wherefore said cushion is flexible at intermediate points, said cushion being attached to said rod by spaced backing plates having pivotal connection with the adjoining resilient cushion section to allow pivotal motion of said cushion.

References Cited

UNITED STATES PATENTS

| | | | |
|---|---|---|---|
| 1,428,679 | 9/1922 | Caswell | 294—118 |
| 2,739,347 | 3/1956 | Sharp | 294—80 X |
| 2,844,403 | 7/1958 | Farmer | 294—67 |
| 3,163,458 | 12/1964 | Brandt | 294—104 X |
| 3,227,480 | 1/1966 | Hinkle | 294—106 X |

GERALD M. FORLENZA, *Primary Examiner.*

G. F. ABRAHAM, *Assistant Examiner.*